Feb. 11, 1936.    S. M. McDONNELL    2,030,753
BRAKE LOCK
Filed Oct. 3, 1934

Samuel M. McDonnell, INVENTOR
BY Victor J. Evans & Co.
ATTORNEY

Patented Feb. 11, 1936

2,030,753

UNITED STATES PATENT OFFICE 2,030,753

BRAKE LOCK

Samuel M. McDonnell, Neenah, Wis.

Application October 3, 1934, Serial No. 746,719

1 Claim. (Cl. 188—265)

This invention relates to brake locks for automobiles and has for the primary object the provision of a device of this character which may be easily mounted to an automobile and connected to the service brake thereof whereby the brake may be secured in brake applying position whenever desired and which will not interfere with the ordinary operation of the brakes when the device is in position to free the brakes.

Another object of the invention is the provision of means for automatically rendering the electrical stop signal of the automobile inoperative when the brake is applied by this invention.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing a portion of an automobile with a brake lock applied thereto and connected to the brake operating means of the brakes of the automobile.

Figure 1:
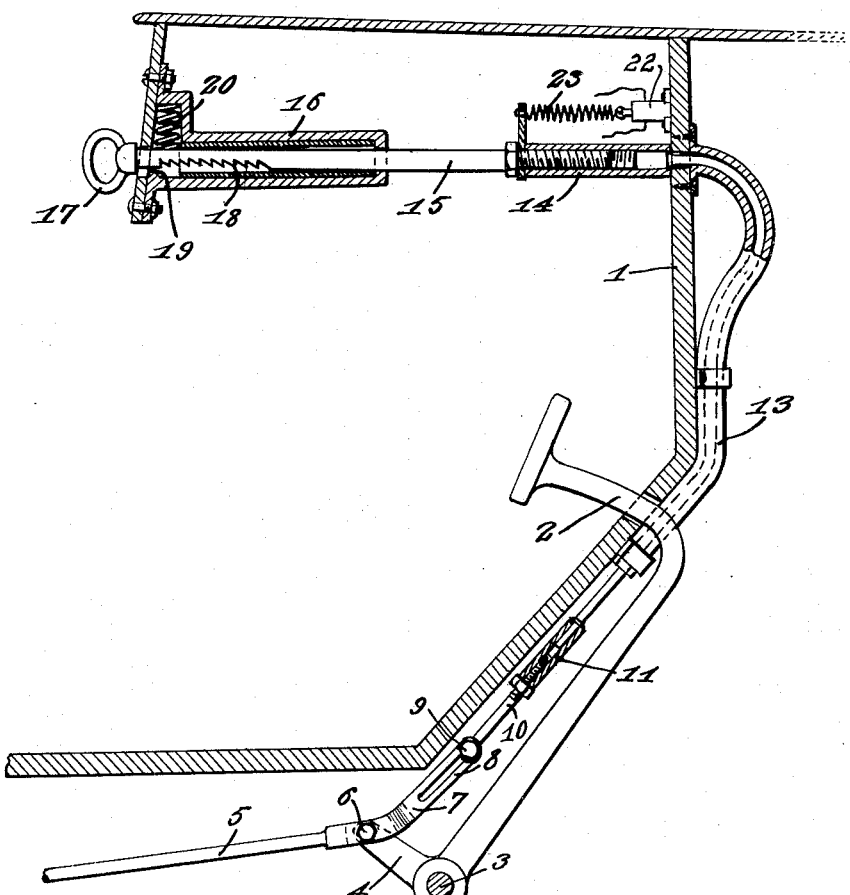
Figure 2:
Figure 2 is a fragmentary view showing the connection of my invention to the brake operating medium.
Figure 3:
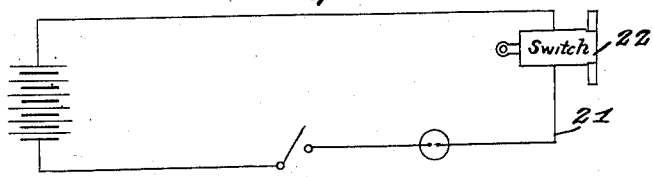
Figure 3 is a diagrammatical view showing the circuit of an electrical stop signal of the automobile with the switch connected therein and operated through the brake lock forming the subject matter of the present invention.

Referring in detail to the drawing, the numeral 1 indicates a fragmentary portion of the body of an automobile and the numeral 2 indicates the usual foot pedal for operating the service brakes of the automobile pivotally mounted, as shown at 3, and provided with an arm 4 pivotally connected to the brake rod 5 by a bolt 6 fitting a specially constructed clevis 7 on the brake rod. The clevis 7 is provided with an extension in the form of spaced slotted arms 8 having connected thereto by means of a bolt 9 a rod 10 including sections adjustably connected by a turnbuckle 11. One of the sections of the rod 10 is of a flexible construction operating through a flexible housing 13 secured to the automobile 1. A tubular sleeve 14 is connected to the flexible section of the rod 10 and is internally screw threaded to receive the screw threaded end of an operating bar 15 slidably mounted in a housing 16 mounted to the body of the automobile and projecting through the usual instrument board and equipped with a handle 17. The bar 15 is provided with a series of teeth 18 adapted to engage with a keeper 19 forming an integral part of the housing 16. A spring 20 engages the bar for normally positioning the latter so that the teeth thereof will engage with the keeper 19. A pull on the handle 17 will bring about applying of the service brakes of the automobile and bringing a tooth on the bar 15 in engagement with the keeper 19 the bar will be held against releasing of the service brakes. Thus it will be seen that the operator when leaving the vehicle may pull upon the handle 17 and apply the service brakes and on returning to the automobile all that is necessary for the operator to release the service brake is to disengage the tooth of the bar from the keeper 19 and move the bar 15 inwardly. A slight upward movement of the handle 17 will disengage the teeth from the keeper.

The character 21 indicates the electric circuit of the electrical stop signal of the automobile and interposed in this circuit is a switch 22 connected to the bar 15 by a spring 23. The bar 15 when moved inwardly to release the brakes closes the switch 22 so that the stop signal may operate in the ordinary manner. However, when the bar 15 is pulled outwardly to apply the service brakes the switch 22 is actuated and breaks the electric circuit 21 to the stop signal.

Having described the invention, I claim:

A brake lock comprising a slidably mounted rack bar, a keeper to be engaged by said rack bar for holding the latter in adjusted positions, a rod including adjustably connected sections and one of said sections being of flexible construction and connected to the rack bar, a flexible housing for supporting the flexible section of said rod, and a limited slidable connection connecting said rod to the brake rigging of the service brake pedal of an automobile whereby said brake rigging may be actuated by the service brake pedal during one position of the rack bar without interference from the latter and permit operation of the brake rigging to apply brakes by other positions of said rack bar.

SAMUEL McDONNELL.